(12) United States Patent
Pandis et al.

(10) Patent No.: US 11,853,301 B1
(45) Date of Patent: Dec. 26, 2023

(54) SHARING COMPILED CODE FOR EXECUTING QUERIES ACROSS QUERY ENGINES

(71) Applicant: Amazon Technologies, Inc., Seattle, WA (US)

(72) Inventors: Ippokratis Pandis, Menlo Park, CA (US); Naresh Chainani, Mountain View, CA (US); Kiran Kumar Chinta, Fremont, CA (US); Venkatraman Govindaraju, Fremont, CA (US); Andrew Edward Caldwell, Santa Clara, CA (US); Naveen Muralimanohar, San Jose, CA (US); Martin Grund, Lafayette, CA (US); Fabian Oliver Nagel, Mountain View, CA (US); Nikolaos Armenatzoglou, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 897 days.

(21) Appl. No.: 16/370,614

(22) Filed: Mar. 29, 2019

(51) Int. Cl.
*G06F 16/00* (2019.01)
*G06F 16/2455* (2019.01)
*G06F 16/2458* (2019.01)
*G06F 16/22* (2019.01)
*G06F 16/2453* (2019.01)
*G06F 16/242* (2019.01)

(52) U.S. Cl.
CPC .... *G06F 16/24552* (2019.01); *G06F 16/2255* (2019.01); *G06F 16/2443* (2019.01); *G06F 16/2445* (2019.01); *G06F 16/2458* (2019.01); *G06F 16/24539* (2019.01)

(58) Field of Classification Search
CPC .......... G06F 16/2453; G06F 16/24539; G06F 16/24542; G06F 16/24545; G06F 16/24558; G06F 17/30442; G06F 17/30457; G06F 17/30463; G06F 16/24552; G06F 16/2255; G06F 16/2443; G06F 16/2445; G06F 16/2458
See application file for complete search history.

(56) References Cited

U.S. PATENT DOCUMENTS

| | | | |
|---|---|---|---|
| 6,356,887 B1 | 3/2002 | Berenson et al. | |
| 7,743,053 B2 | 6/2010 | Al-Omari et al. | |
| 8,171,018 B2 | 5/2012 | Zane et al. | |
| 10,650,017 B1* | 5/2020 | Gupta | G06F 16/2282 |
| 2012/0084315 A1* | 4/2012 | Schneider | G06F 16/24545 707/769 |
| 2016/0034529 A1* | 2/2016 | Nguyen | G06F 16/24549 707/713 |
| 2016/0357816 A1* | 12/2016 | Dees | G06F 16/24542 |

(Continued)

*Primary Examiner* — Dinku W Gebresenbet
(74) *Attorney, Agent, or Firm* — S. Scott Foster; Kowert, Hood, Munyon, Rankin & Goetzel, P.C.

(57) ABSTRACT

Compiled portions of code generated to perform a query plan at a query engine may be shared with other query engines. A data store, separate from the query engines, may store compiled portions of query code generated for different queries. If a query engine does not have a locally stored compiled portion of query code, then the separate data store may be accessed in order to obtain a compiled portion of query code, allowing reuse of compiled query code across different queries engines for queries directed to different databases.

20 Claims, 10 Drawing Sheets

(56) References Cited

U.S. PATENT DOCUMENTS

2017/0371926 A1\* 12/2017 Shiran ............... G06F 16/24542
2018/0150518 A1\* 5/2018 Merker ............. G06F 16/24542
2018/0260437 A1\* 9/2018 Paroski ................. G06F 8/447
2018/0349404 A1\* 12/2018 Noh ................. G06F 16/24534

\* cited by examiner

SHARING COMPILED CODE FOR EXECUTING QUERIES ACROSS QUERY ENGINES

BACKGROUND

As the technological capacity for organizations to create, track, and retain information continues to grow, a variety of different technologies for managing and storing the rising tide of information have been developed. Different storage systems, database systems, and other data processing platforms may use code generation at run-time in order to optimize the execution of queries, as the instruction footprint becomes smaller with much fewer branches and function calls. Techniques to improve the performance of code generation and execution at run-time may provide further performance improvements to queries in such systems.

Figure 1:
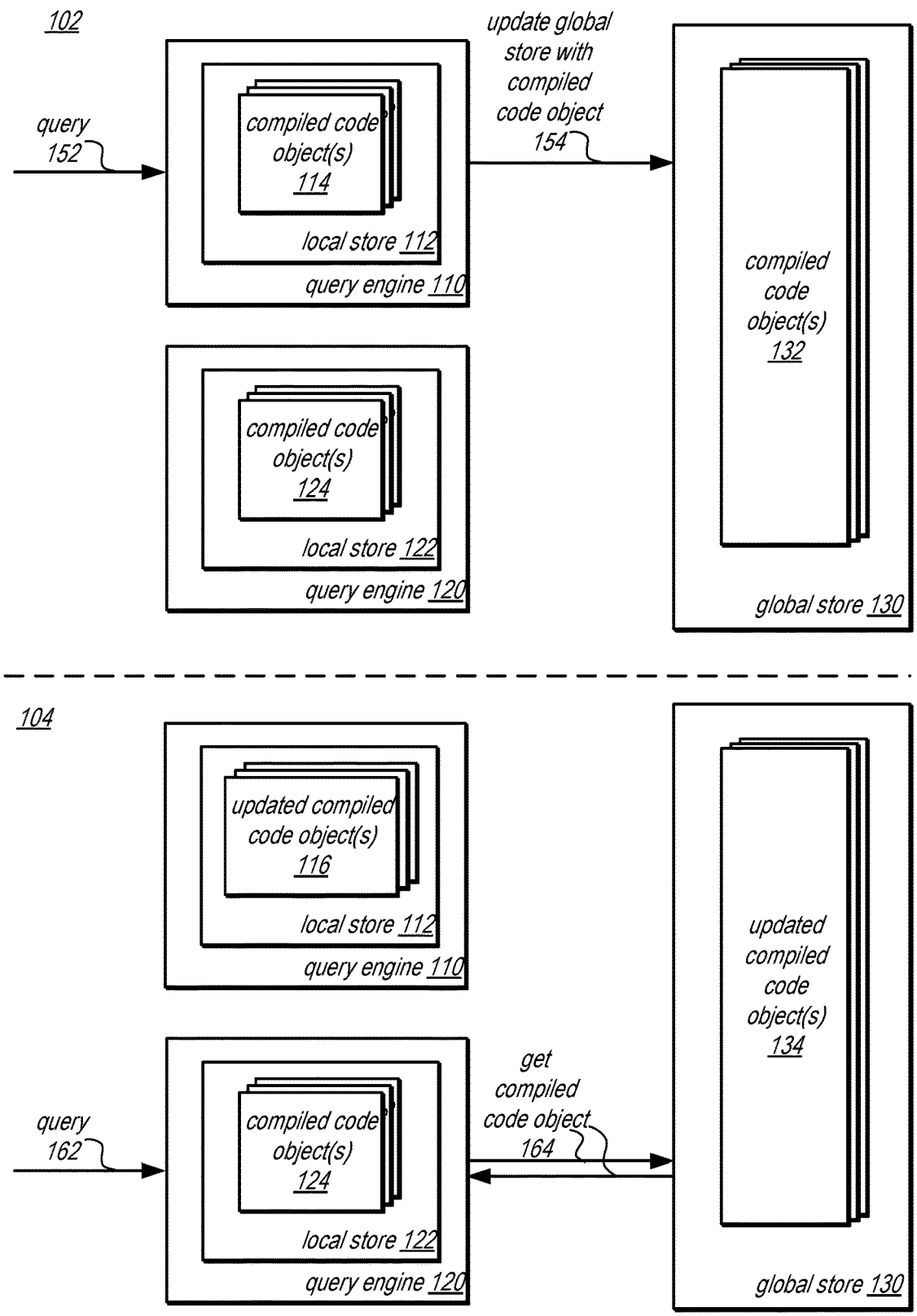
FIG. 1 illustrates a logical block diagram of sharing compiled code to execute queries across query engines, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of sharing compiled code to execute queries across query engines are described herein. As noted earlier, data processing systems may use code generation at run-time in order to increase the performance of queries. Generating code to perform queries, however, may involve compiling the code to perform the query as part of the query performance process at a query engine. For example, a query engine may generate the code and then compiles the code invoking a compiler process (e.g., Gnu Compiler Collection (gcc)). In some scenarios, the compilation time may actually be higher than the run-time of the query (once compilation is complete).

Sharing compiled code to execute queries across query engines may take advantage of the substantial amount of re-use available for generated code to perform queries. For example, similar-looking query plans may end up generating the same fragment or segment of code. Storing previously generated code for fragments, segments, or other portions of code to perform a query can reduce compilation time, and thus reduce query performance time. Sharing compiled code may further reduce compilation time, even in scenarios where query engine has not seen many (or any queries), creating a "cold start" scenario for the store (e.g., cache) of generated code. For example, sharing compiled code may utilize a code pool, such as a global compiled code store, that it is visible and shareable across a collection of query engines and databases. Thus, even if a query to one query engine that handles requests to one database includes a portion of code compiled in a different query received at a different query engine for a different database, some reuse of the compiled code can be achieved reducing the performance costs of the later and unrelated query. Sharing compiled code for execution across query engines may allow many (or all) unique code portions to be executed only once per group of query engines that access the global compiled code store. Moreover, in order to minimize the remaining "cold start" effect for new query engines, the global compiled code store may be evaluated and used to "warm" or pre-populate a local cache for a query engine with compiled code the query engine is likely to receive (but has not yet received), as discussed below with regard to FIGS. 6 and 9.

FIG. 1 illustrates a logical block diagram of sharing compiled code to execute queries across query engines, according to some embodiments. Query engines 110 and 120 may be implemented as part of respective data processing engines, systems or platforms (e.g., a database processing platform, a map-reduce platform, etc.). As illustrated in scene 102, when a database query is received at query engine 110, such as query 152, query engine 110 may determine a query plan to execute the query, in some embodiments. From the query plan code may be generated to execute the plan, as discussed below with regard to FIGS. 4 and 7. Query engine 110 may implement a local store 112, which may store compiled code object(s) 114. For portions of code that have compiled objects stored in local store 112, query engine 110 may perform the compiled portions without performing a compilation of the corresponding portions of code (but may instead input or update new parameters when invoking execution of the compiled code objects). However, for query where the compiled code is not present, a check in global store 130, which may be separately hosted from query engines 110 and 120 to determine if the code object is present. If not, then query engine 110 may compile the code object in order to perform the query and update compiled code objects 116. As discussed below with regard to FIG. 4, query engine 110 may directly update global store with compiled code object 154 and/or store the code for another system, such as query execution code compilation service 250 to generate and update 154 global store 130.

Although query engine 110 had to compile the portion of code, the compilation cost may be used to generate cost savings for that query engine 110, and other query engines like query engine 120. For example, as illustrated in scene 104, query engine 120 may receive query 162. Query 162 may have a portion of generated code not found among compiled code objects 124 in local store 122. Instead, query engine 120 may get the compiled code object 164 from updated code object(s) 134, as query engine 110 had already seen and compiled the code object for that same code (even if query 162 is a different query directed to a different database).

Please note that the previous description of sharing compiled code to execute queries across query engines is a logical illustration and thus is not to be construed as limiting as to the implementation of a query engine, local store or global store.

This specification begins with a general description of a provider network that implements multiple different services, including data processing services and storage services, which may perform sharing compiled code to execute queries across query engines. Then various examples of multiple data processors, such as a data warehouse service, including different components/modules, or arrangements of components/module that may be employed as part of implementing the data processors are discussed. A number of different methods and techniques to implement sharing compiled code to execute queries across query engines are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
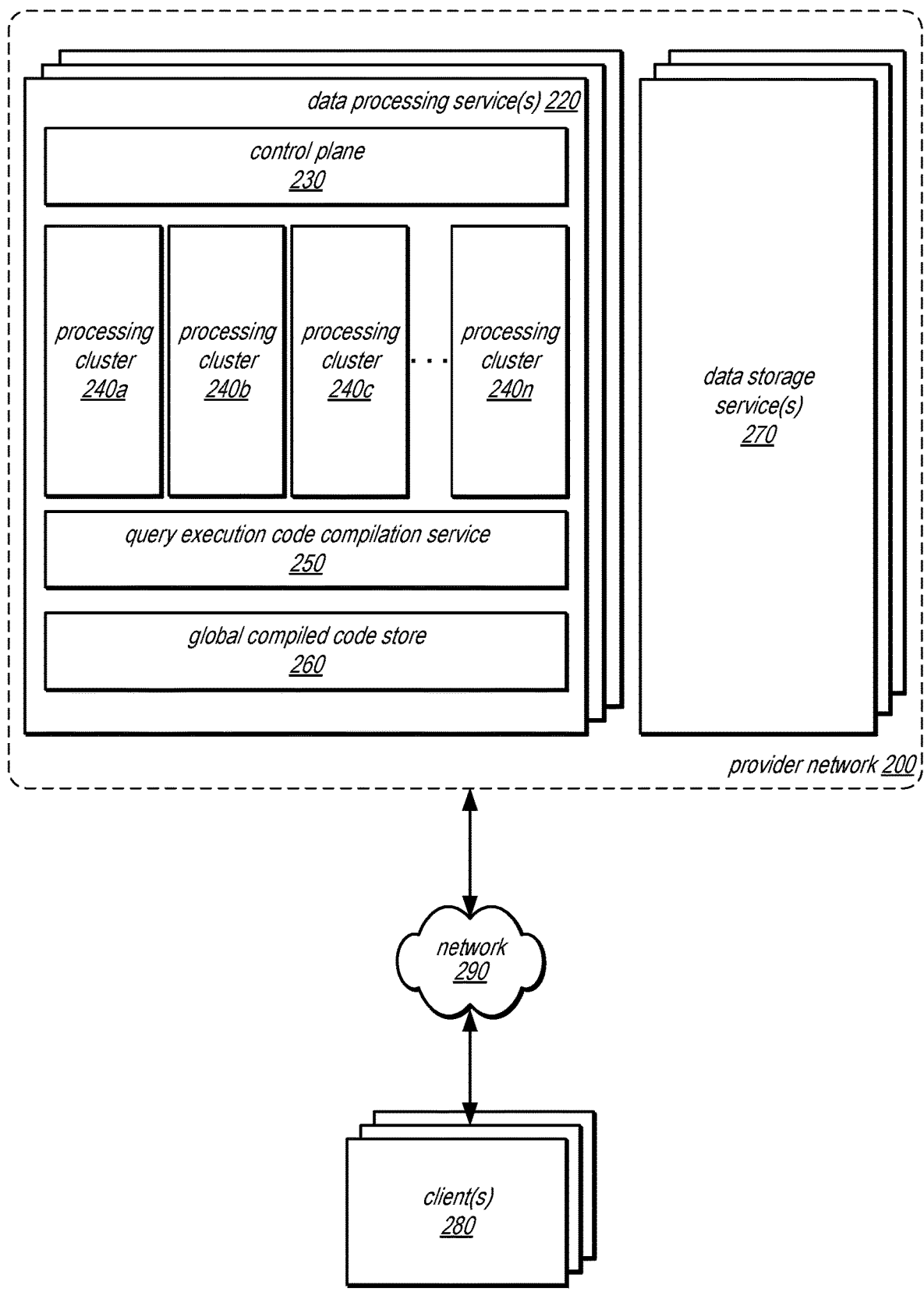
FIG. 2 is a logical block diagram illustrating a provider network offering data processing services that implement sharing compiled code to execute queries across query engines, according to some embodiments.

FIG. 2 is a logical block diagram illustrating a provider network offering data processing services that implement sharing compiled code to execute queries across query engines, according to some embodiments. Provider network 200 may be a private or closed system or may be set up by an entity such as a company or a public sector organization to provide one or more services (such as various types of cloud-based storage) accessible via the Internet and/or other networks to clients 280. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as data processing service(s) 220, (e.g., a map reduce service, a data warehouse service, and other large scale data processing services or database services), format independent data processing service 220, and data storage services 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data processing service 220, or data storage service 270) may be implemented by a particular node or may be distributed across several nodes. In some embodiments, a given node may implement the functionality of more than one service system component (e.g., more than one data store component).

Data processing services 220 may be various types of data processing services that perform general or specialized data processing functions (e.g., anomaly detection, machine learning, data mining, big data querying, or any other type of data processing operation). For example, in at least some embodiments, data processing services 220 may include a map reduce service that creates clusters of processing nodes that implement map reduce functionality over data stored in the map reduce cluster as well as data stored in one of data storage services 270. In another example, data processing service(s) 220 may include various types of database services (both relational and non-relational) for storing, querying, and updating data. Such services may be enterprise-class database systems that are highly scalable and extensible. Queries may be directed to a database in data processing service(s) 220 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 220 may implement, in some embodiments, a data warehouse service.

Data storage service(s) 270 may implement different types of data stores for storing, accessing, and managing data on behalf of clients 280 as a network-based service that enables clients 280 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 280 may encompass any type of client that can submit network-based requests to provider network 200 via network 260, including requests for storage services (e.g., a request to query a data processing service 220, or a request to create, read, write, obtain, or modify data in data storage service(s) 270, etc.). For example, a given client 280 may include a suitable version of a web browser, or may include a plug-in module or other type of code module that can execute as an extension to or within an execution environment provided by a web browser. Alternatively, a client 280 may encompass an application such as a database application (or user interface thereof), a media application, an office application or any other application that may make use of data processing service(s) 220, format independent data processing service 220, or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 280 may be an application that can interact directly with provider network 200. In some embodiments, client 280 may generate network-based services requests according to a Representational State Transfer (REST)-style network-based services architecture, a document- or message-based network-based services architecture, or another suitable network-based services architecture.

In some embodiments, a client 280 may provide access to provider network 200 to other applications in a manner that is transparent to those applications. For example, client 280 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 280 and the operating system or file system on behalf of applications executing within the operating system environment. Similarly, a client 280 may be an analytics application that relies upon data processing service(s) 220 to execute various queries for data already ingested or stored in the data processing service (e.g., such as data maintained in a data warehouse service, like data warehouse service) or data stored in a data lake hosted in data storage service(s) 270.

Clients 280 may convey network-based services requests (e.g., access requests to read or write data may be directed to data in data storage service(s) 270, or operations, tasks, or jobs, being performed as part of data processing service(s) 220) to and receive responses from provider network 200 via network 260. In various embodiments, network 260 may encompass any suitable combination of networking hardware and protocols necessary to establish network-based-based communications between clients 280 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 280 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 280 and the Internet as well as between the Internet and provider network 200. It is noted that in some embodiments, clients 280 may communicate with provider network 200 using a private network rather than the public Internet. In some embodiments, clients of data processing services 220, format independent data processing service 220, and/or data storage service(s) 270 may be implemented within provider network 200 (e.g., an application hosted on a virtual computing resource that utilizes a data processing service 220) to implement various application features or functions and thus various features of client(s) 280 discussed above may be applicable to such internal clients as well.

In at least some embodiments, one of data processing service(s) 220 may be a data warehouse service. A data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

A data warehouse service may be implemented by a large collection of computing devices, such as customized or off-the-shelf computing systems, servers, or any other combination of computing systems or devices, such as the various types of systems 1000 described below with regard to FIG. 10. For example, different subsets of these computing devices may be controlled by control plane 230. Control plane 230, for example, may provide a cluster control interface to clients or users who wish to interact with the processing clusters 240 managed by control plane 230. For example, control plane 230 may generate one or more graphical user interfaces (GUIs) for storage clients, which may then be utilized to select various control functions offered by the control interface for the processing clusters 240 hosted in the data warehouse service. Control plane 230 may provide or implement access to various metrics collected for the performance of different features of data warehouse service, including processing cluster 240 performance, in some embodiments.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), along with many other data management or storage services. Multiple users or clients may access a processing cluster to obtain data warehouse services. In at least some embodiments, a data warehouse service may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 240a, 240b, through 240n, hosted by the data warehouse service may provide an enterprise-class database query and management system that allows users to send data processing requests to be executed by the clusters 240, such as by sending a query to a cluster control interface implemented by the network-based service. Processing clusters 240 may perform data processing operations with respect to data stored locally in a processing cluster, as well as remotely stored data. For example, an object-based storage service may be a data storage service 270 implemented by provider network 200 that stores remote data. Queries sent to a processing cluster 240 may be directed to local data stored in the processing cluster 240. Therefore, processing clusters may implement local data processing to plan and execute the performance of queries with respect to local data in the processing cluster.

Operations performed by control plane 230 to scale processing clusters 240 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Query execution code compilation service 250 and global compiled code store 260 may, as discussed below allow for the sharing of execution code across queries, as discussed in more detail below with regard to FIGS. 4-8.

Figure 3:
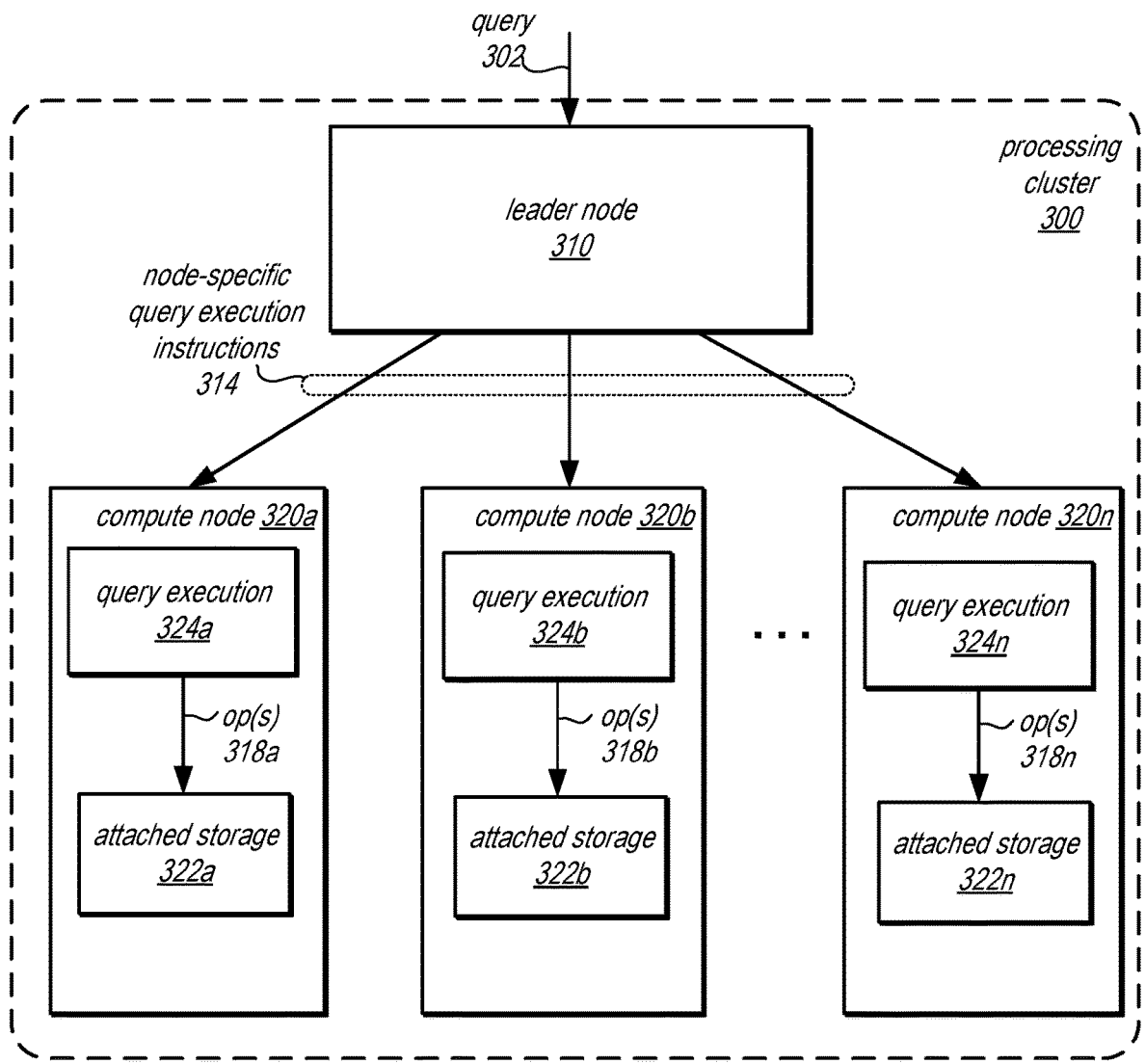
FIG. 3 is a logical block diagram illustrating an example processing cluster of a data processing service that may implement sharing compiled code to execute queries across query engines, according to some embodiments.

FIG. 3 is a logical block diagram illustrating an example processing cluster of a data processing service that may implement sharing compiled code to execute queries across query engines, according to some embodiments. Processing cluster 300 may be a data warehouse cluster, or other data processing platform like processing clusters 240 discussed above with regard to FIG. 2, or another processing cluster that distributes execution of a query among multiple processing nodes. As illustrated in this example, a processing cluster 300 may include a leader node 310 and compute nodes 320a, 320b, and 320n, which may communicate with each other over an interconnect (not illustrated). Leader node 310 may implement query planning to generate query plan(s) and instructions for executing queries on processing cluster 300 that perform data processing, as discussed in detail below with regard to FIG. 4. As described herein, each node in a processing cluster 300 may include attached storage, such as attached storage 322a, 322b, and 322n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 300 is a leader node as illustrated in FIG. 3, but rather different nodes of the nodes in processing cluster 300 may act as a leader node or otherwise direct processing of queries to data stored in processing cluster 300. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 300 may be implemented as part of a data warehouse service, or another one of data processing service(s) 220. Leader node 310 may manage communications with clients, such as clients 280 discussed above with regard to FIG. 2. For example, leader node 310 may be a server that receives a query 302 from various client programs (e.g., applications) and/or subscribers (users), then parses them and develops an execution plan (e.g., query plan(s)) to carry out the associated database operation(s)). More specifically, leader node 310 may develop the series of steps necessary to obtain results for the query. Query 302 may be directed to data that is stored both locally within processing cluster 300 (e.g., at one or more of compute nodes 320) and data stored remotely (which may be accessible by another data processing service and/or storage service (not illustrated)). Leader node 310 may also manage the communications among compute nodes 320 instructed to carry out database operations for data stored in the processing cluster 300. For example, node-specific query instructions 314 may be generated or compiled code that is distributed by leader node 310 to various ones of the compute nodes 320 to carry out the steps needed to perform query 302, as discussed in detail below with regard to FIG. 4. Leader node 310 may receive data and query responses or results from compute nodes 320 in order to determine a final result for query 302. A database schema, data format and/or other metadata information for the data stored among the compute nodes, such as the data tables stored in the cluster, may be managed and stored by leader node 310.

Processing cluster 300 may also include compute nodes, such as compute nodes 320a, 320b, and 320n. Compute nodes 320, may for example, be implemented on servers or other computing devices, such as those described below with regard to computer system 1000 in FIG. 10, and each may include individual query processing "slices" defined, for example, for each core of a server's multi-core processor, one or more query processing engine(s), such as query execution platform(s) 324a, 324b, and 324n, to execute the instructions 314 or otherwise perform the portions of the query plan assigned to the compute node. Query execution 324 may access a certain memory and disk space in order to process a portion of the workload for a query (or other database operation) that is sent to one or more of the compute nodes 320. Query execution 324 may access attached storage, such as 322a, 322b, and 322n, to perform operation(s), such as operations 318a, 318b, and 318n. For example, query engine 324 may scan data in attached storage 322, access indexes, perform joins, semi joins, aggregations, or any other processing operation assigned to the compute node 320. Compute nodes 320 may send intermediate results from queries back to leader node 310 for final result generation (e.g., combining, aggregating, modifying, joining, etc.).

Attached storage 322 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
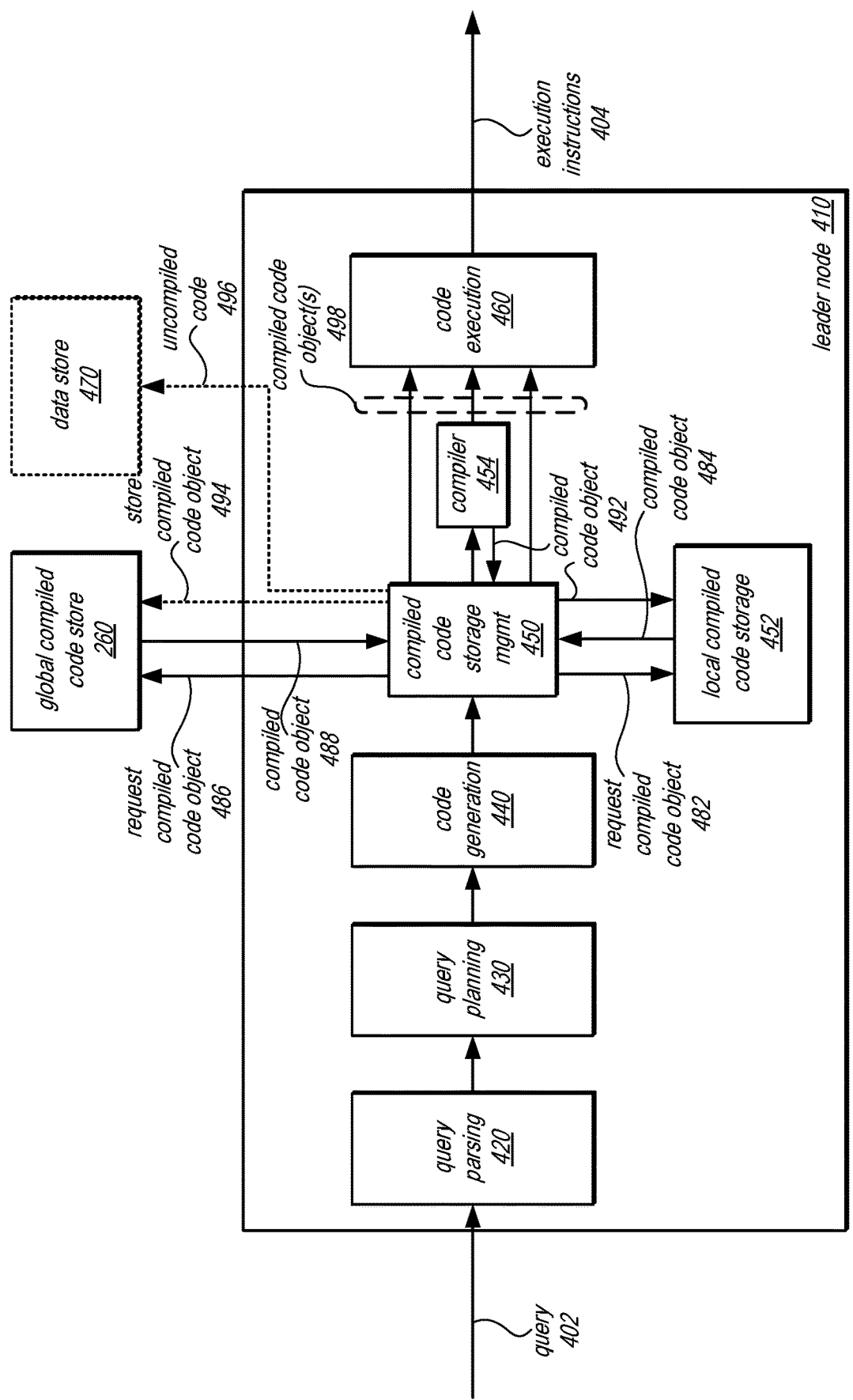
FIG. 4 is as logical block diagram illustrating a leader node that obtains shared execution code for performing queries, according to some embodiments.

FIG. 4 is as logical block diagram illustrating a leader node that obtains shared execution code for performing queries, according to some embodiments. Leader node 410, similar to leader node 310 discussed above with regard to FIG. 3, may implement various features to handle a query received from a client. For example, leader node 410 may implement query parsing 420, which may take a received query 402, and check for query validity (e.g., syntax errors), and generate a parse tree, symbol tree, or other output that can be used to generate a plan to perform a query. Leader node 410 may implement query planning 430 to evaluate the features of the parsed query and generate a plan to perform the query. For example, query planning 430 may apply various rules to generate an initial tree or graph of operations, logical and physical, to perform the query. Query planning 430 may then perform various rule-based optimizations to reduce the cost of performing the query, such as modifying the order or type of join operations, selecting different types of scans, filters, or other operations. In some embodiments, query planning 430 may implement cost-based optimization to select amongst multiple different possible query plans to identify the plan with the lowest cost.

Leader node 410 may implement code generation 440, in various embodiments. Code generation 440 may accept a query plan and identify (e.g., via a library or other mapping), the various functions, procedures, statements, classes, or other instructions to include in a program language to output as the execution code. In at least some embodiments, code generation may break down a query plan into a series of individual streams, segments and segment steps. In this way, each stream may be processed sequentially so that the code for each segment within a stream is generated and compiled to produce an object file to perform that portion of the query.

In at least some embodiments, leader node 410 may implement compiled code storage management 450, which may identify whether to use previously compiled code portions or to compile the code at compiler 454 for performing the query. Various techniques, such as those discussed below with regard to FIGS. 7 and 8, may be implemented by compiled code storage management 450, in some embodiments. For example, compiled code storage management 450 may evaluate each code segment from code generation 440, and request 482 a compiled object for the code segment from local compiled code storage 452. If local compiled code storage 452 returns the compiled code object 484, then compiled code storage management 450 may submit the compiled code object 498 to code execution.

If local compiled code storage 452 does not store the compiled object for the code segment, then compiled code storage management 450 may attempt to request 486 the compiled code object from global compiled code store 260. If global compiled code store 260 has the compiled code object, it may return the compiled object 488. Compiled code storage management 450 may then submit 498 the compiled code object to code execution 460. If a compiled code object for the code segment cannot be obtained, however, then compiled code storage management 450 may submit the code segment to compiler 454, which may compile the code segment and submit 498 the code segment to code execution 460. Compiler 454 may also provide the compiled code object 492 back to code compiled storage management 450, which may update 492 local compiled code storage 452 to include the compiled code object.

In some embodiments, compiled code storage management 450 may store the compiled code object 494 direct to global compiled code store 260. In other embodiments, as discussed below with regard to FIG. 5, compiled code storage management 450 may store the uncompiled code 496 to a data store 470 which query execution code compilation service 250 may access to compile.

Code execution 460 may then send execution instructions 404 to other nodes in a processing cluster to perform the compiled code. In some embodiments, leader node 410 may perform some or all of the compiled code objects.

Figure 5:
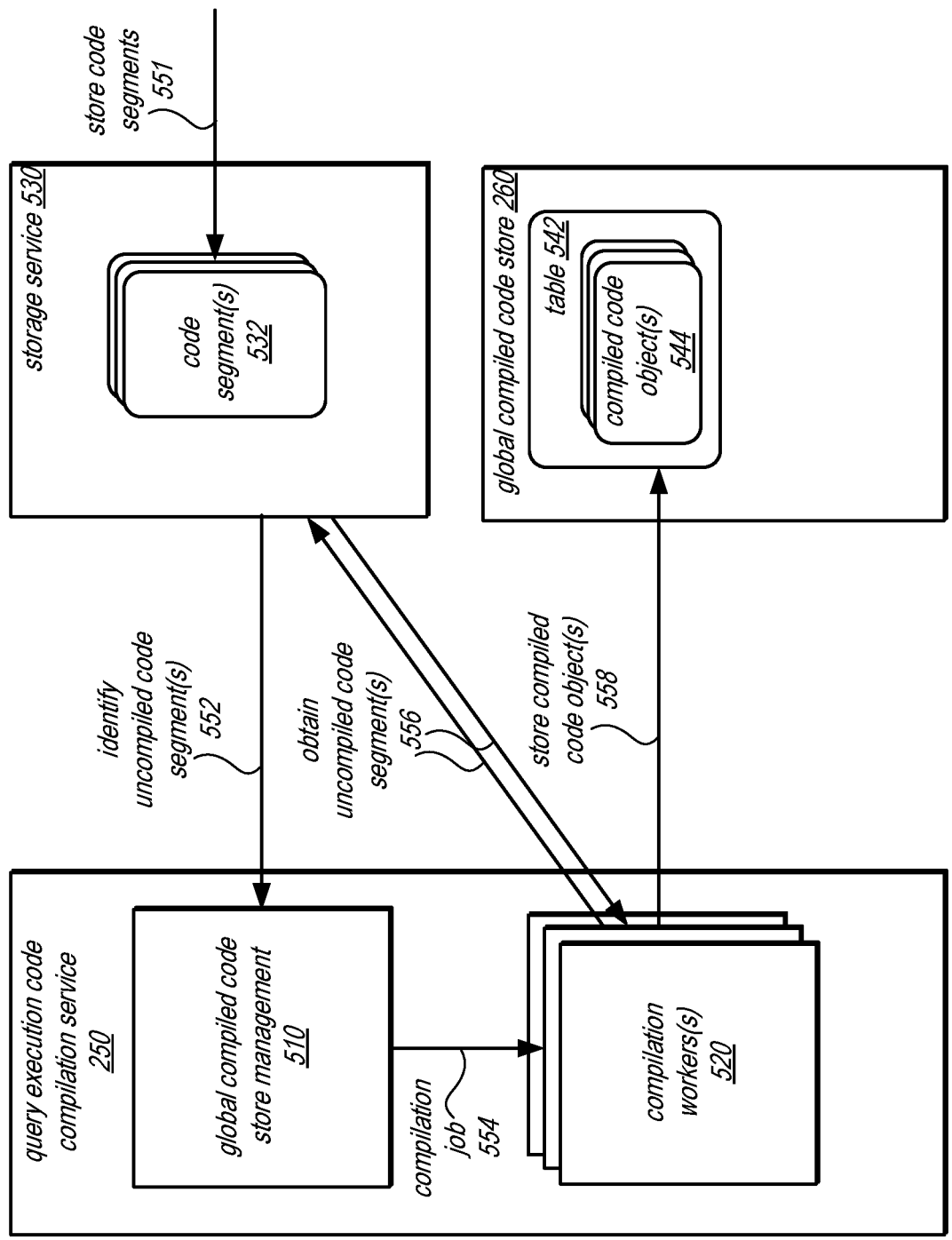
FIG. 5 is a logical block diagram illustrating a query execution code compilation service, according to some embodiments.

FIG. 5 is a logical block diagram illustrating a query execution code compilation service, according to some embodiments. Query execution code compilation service 250 may implement global compiled code store management 510 in order to manage global compiled code store 260. Global compiled code storage management 510 may direct compilation worker(s) 520 (e.g., compilers and other data access applications hosted on systems, such as computing system 1000 discussed below in FIG. 10) in order to access and update global compiled code store 260. Storage service 530 may be an object store, file store, or other data storage system which may accept requests to store code segments 551 generated by query engines, as discussed above with regard to FIG. 4. These code segments 532 may be stored as distinct items or objects in storage service 530 so that the code segment(s) 532 may be individual compiled to create individual executable objects, in some embodiments.

Global compiled code storage management 510 may detect or otherwise identify uncompiled code segments 552. For example, storage service 530 may send an update or other notification to global compiled code storage management 510 when new code segments are stored, in some embodiments. In other embodiments, global compiled code store management 510 may sweep or poll storage service 530 for new code segment(s) 532. Global compiled code storage management 510 may submit a compilation job 554 to compilation worker(s) 520 to obtain and compile code segment(s) 532. Compilation worker(s) 520 may obtain 556 the code segment(s) 532 from the storage service 530 and store the compiled code object(s) 558 in global code store 260. For example, the compiled code objects may be stored in a table 542 with individual items, objects, or entries of table 542 corresponding to different compiled code objects 544. In some embodiments, compilation worker(s) 520 may encrypt and/or compress the compiled code objects before storing 520. Because compilation worker(s) 520 may compile code segments outside of the performance path of the query that submitted the code segments, compilation worker(s) 520 may perform computationally expensive but optimal compilation features to enhance code performance (e.g., in a processor, memory, network, storage, or other resource utilization), in some embodiments, which may be different than the compilation features or settings used at a processing cluster to compile code generated in response to a query received at the processing cluster.

Figure 6:
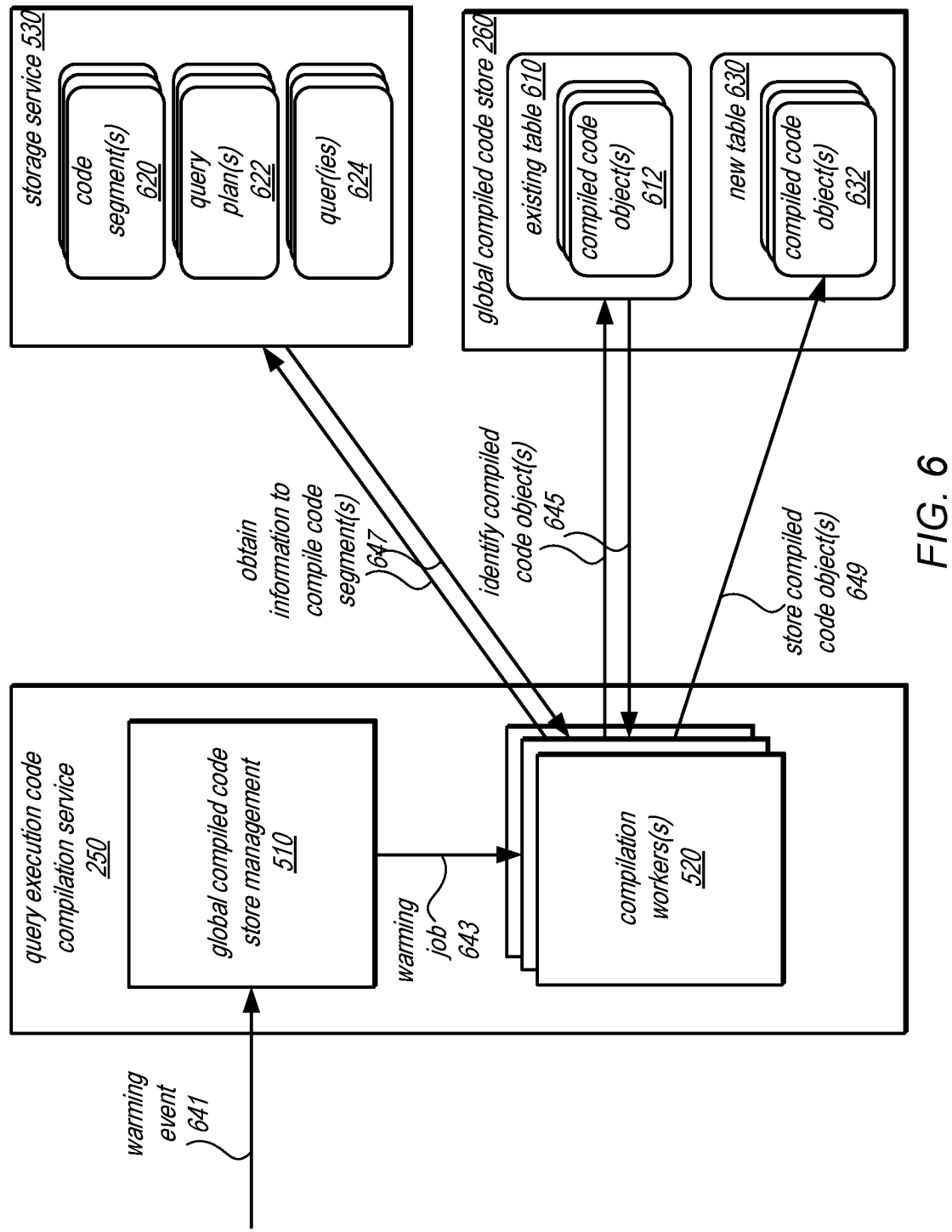
FIG. 6 is a logical block diagram illustrating warming events for a global compiled code store, according to some embodiments.

FIG. 6 is a logical block diagram illustrating warming events for a global compiled code store, according to some embodiments. As discussed above with regard to FIG. 5, query execution code compilation service 250 may implement global compiled code storage management 510, which may, in various embodiments, detect a warming event 641 (e.g., in response to an externally triggered event and request to warm a cache), such as an indication of an update to query engine application deployed across the data processing service.

Global compiled code management 510 may issue a warming job 643 to one (or more compilation worker(s) 520), which may generate a warmed table of compiled objects using various techniques, such as those discussed below with regard to FIG. 9. For example, compilation worker(s) 520 may send request(s) 645 to global compiled code store 260 to access existing table 610, which may store compiled code objects 612. The identified compiled code object(s) 645 may indicate those portions of code likely to be used again in the new table. Thus compilation worker(s) 520 may send requests 647 to obtain information to compile code segment(s) 647, corresponding to compiled code object(s) 612 (e.g., code segment(s) 620, query plans(s) 622 that cause the code segments to be generated, or the quer(ies) 624 that cause the code segments to be generated) from storage service 530. Compilation worker(s) 520 may then compile the obtained code segments (e.g., using settings, libraries, features, or other changes that correspond to the detected warming event, such as a new query engine version deployed) and then store the compiled code object(s) 649, in some embodiments. For example, code segment(s) 620 may compiled without further processing, or query plan(s) 622 may be used to generate the code segments which are then compiled, or quer(ies) 624 may be used to generate query plans and then the code segments which are then compiled). The compiled code object(s) 632 may be stored in new table 630, which may, for instance, correspond to a new query engine application or other changes to compilation incurred by the warming event. In some embodiments, a time to live or other value may be set for stored compiled code objects so that the code objects may be deleted or made inaccessible after a period of time.

Figure 7:
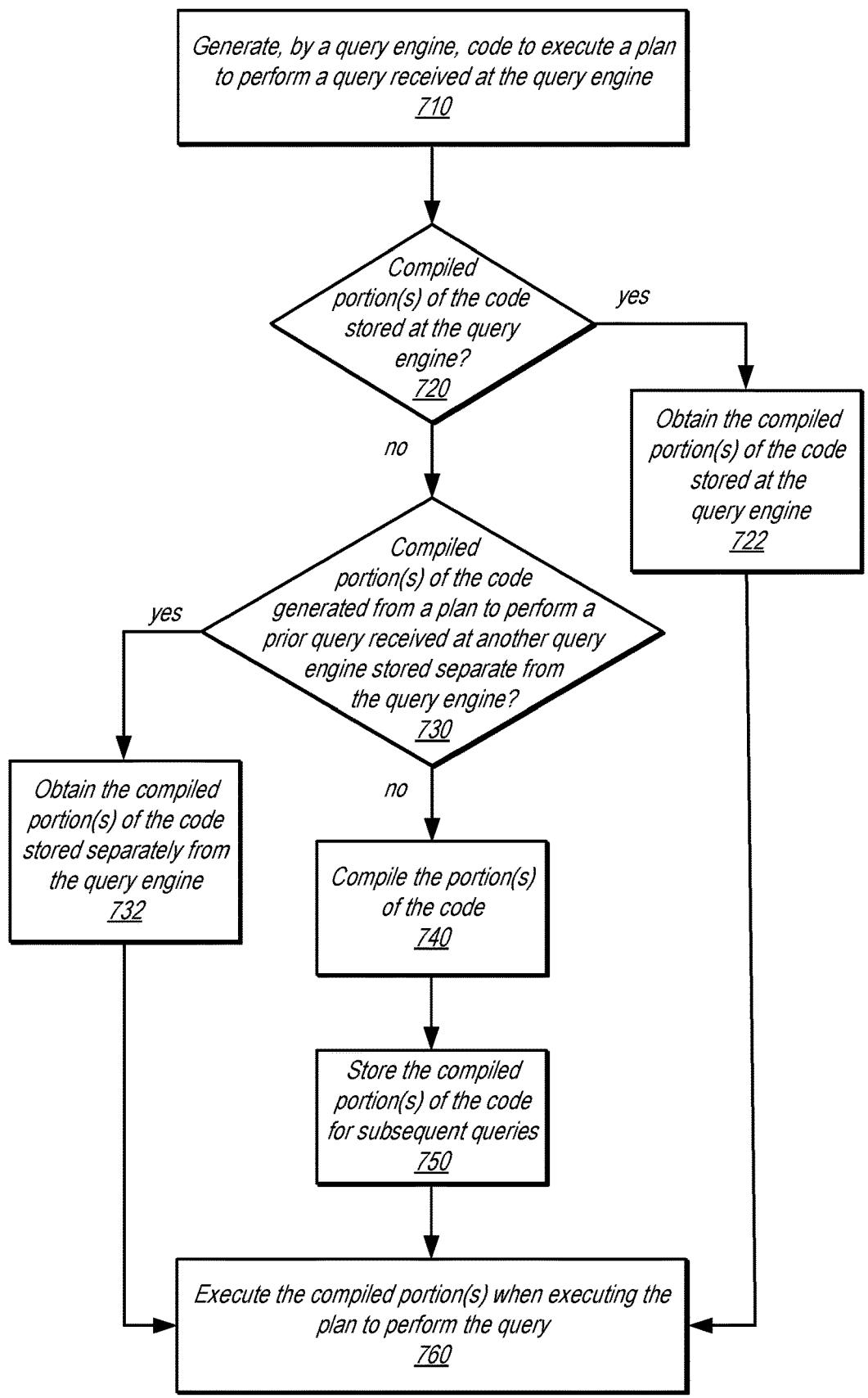
FIG. 7 is a high-level flowchart illustrating methods and techniques to implement sharing compiled code to execute queries across query engines, according to some embodiments.

Although FIGS. 2-6 have been described and illustrated in the context of a provider network implementing different data processing services, like a data warehousing service, the various components illustrated and described in FIGS. 2-6 may be easily applied to other data processing systems that utilize multiple query engines to perform queries that may perform common portions of query operations such that execution code may be shared. As such, FIGS. 2-6 are not intended to be limiting as to other embodiments of sharing compiled code to execute queries across query engines. FIG. 7 is a high-level flowchart illustrating methods and techniques to implement sharing compiled code to execute queries across query engines, according to some embodiments. Various different systems and devices may implement the various methods and techniques described below, either singly or working together.

A query may be received at a query engine (e.g., a database engine, system or platform, such as a data warehouse or other data processing cluster (e.g., other types of database systems, including relational and non-relational database systems), in some embodiments. The query may be specified in according to various formats, languages (e.g., Structured Query Language (SQL), protocols, or interfaces (e.g., query statements or predicates included in Application Programming Interface (API) message or request), in some embodiments. In order to perform the query, a query plan may be generated according to various query plan optimization techniques. For example, the operations to perform the query plan may be identified and arranged in various orders (e.g., different join orders). Each of the plans may then have a cost or value assigned to the plan so that the plan with the lowest cost may be selected in order to provide the best performance for the query.

As indicated at 710, code to execute a plan may be generated by the query engine that received the query, in various embodiments. For example, a plan may be organized according to a tree or other structure that indicates relationships between operations in the plan. The plan may be a logical plan, in some embodiments, which may be mapped to operations in a physical query plan. For example, operations such as operations to find data (e.g., scan data), evaluate data (e.g., compare values with predicates, operators, or other data feature evaluations), transform data (e.g., aggregations, filtering, insertions, deletions, etc.), or move or manipulate data (e.g., join operations) may be transformed into code by a library or other mapping information that translates an identified operation into one or more functions, procedures, statements, classes, or other portions of code to perform the operations.

As indicated at 720, a determination may be made as to whether compiled portion(s) of the code are stored at the query engine, in some embodiments. For example, a manifest, index, or lookup table for compiled code portions that corresponds to the different portions of generated code may be maintained, which may be scanned, compared, or evaluated. As discussed below with regard to FIG. 8, a unique identifier may be generated and used as a lookup value based on the content of the generated code or other features, such as version identifier for the query engine. If code portions are locally stored, then the compiled portion(s) of the code may be obtained, as indicated at 722, in some embodiments. For example, an identifier, file path, or other feature that points to the location of the compiled code may be identified when determining whether compiled portions of the code are stored at the query engine.

As indicated at 730, a determination may be made as to whether compiled portion(s) of the code generated from a plan to perform a prior query received at another query engine stored separate from the query engine, in some embodiments. The separate store, as discussed above with regard to FIGS. 1 and 4-6 may be a separate storage system (e.g., a database system or file system) which may be stored in a remote computing devices accessed by the query engine via network requests, in some embodiments. For example, as discussed below with regard to FIG. 8, to check whether a compiled portion exists, a request to perform a lookup formatted according to the storage system that includes a lookup key generated from the content of the code may be sent. In some embodiments, cached or local manifest of the contents of the separate store may be maintained at the query engine and evaluated locally (instead of sending a request to the separate store so that requests are only sent for compiled objects that are present), in some embodiments. The compiled portions may be generated from a query received prior to the query being performed and received at a different query engine, in some embodiments.

As indicated at 732, if compiled portion(s) are stored separate, then the compiled portion(s) stored separately may be obtained, in some embodiments. For example, a request to access, read, retrieve, or otherwise get the compiled portions may be sent to a storage system for the compiled portions stored separately. In some embodiments, the compiled portions may be encrypted, compressed, or otherwise encoded so that the received compiled portions may be decoded when received. The compiled portion(s) may then be stored at the first query engine (e.g., in local compiled code storage 452) for subsequent use. In some embodiments, more than the compiled portion(s) of the code may be obtained. For example, a set of compiled code objects which may be used in for code in multiple queries may be obtained (even if it is not used in the instant query).

For portions of the generated code that are not separately stored, the portions may be compiled as indicated at 740, in some embodiments. A compiler corresponding to the type of language and/or features used to implement the code may accept the code portions as input and generate executable objects that are compiled versions of the portion(s) of the code. As indicated at 750, the compiled portion(s) of the code may be stored for subsequent queries, in some embodiments. For example, as discussed above with regard to FIGS. 4 and 6, different techniques for updating the separately stored compiled code may be implemented, such as storing the code to a separate store, from which it may be obtained and compiled, or storing the code compiled by the query engine directly to the separate store. In some embodiments, criteria limiting code that may be stored in the separate store may be applied, such as a size limit that prevents code that is too large from being separately stored or a safety/security criteria that limits the types of operations included in the code which can be compiled by the query engine for storage at the separate store. In some embodiments, the location in which the compiled code portion(s) are stored may be determined according to a size of the compiled code portion(s). For example, compiled code objects larger than a threshold size may be stored in an object data store (which may not have size limits for data objects) and compiled objects less than the threshold size may be stored in a database or quick access caching store (which may have a size limit for data objects).

As indicated at 760, the compiled portion(s) may be executed when executing the plan to perform the query, in some embodiments. Different portions of code for the same query may be obtained from different sources or compiled locally at the query engine. For example, one portion may be obtained from the separate store, another portion from the store at the query engine, and another portion compiled by the query engine (as well as various other combinations of obtaining compiled portions of the code), in various embodiments. In some embodiments, an entire query may be compiled and stored for reuse, locally and/or in separate storage. In some embodiments, the query itself may be stored (or the query plan stored) for recompilation according to different compilation features (e.g., optimized compilation). To execute the plan using the compiled portions, various features of the query plan may be used as input parameters to the compiled code when executed.

Figure 8:
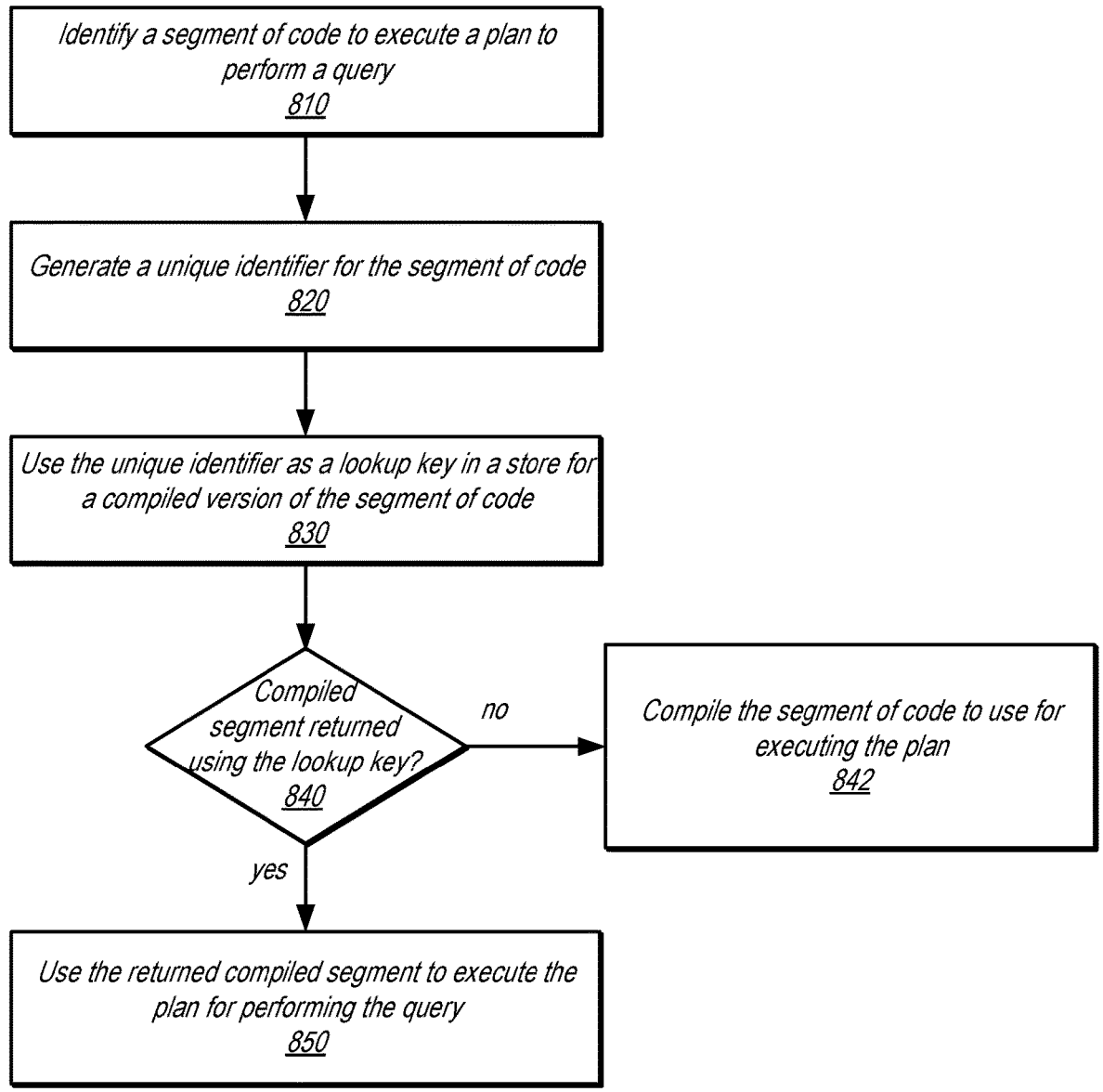
FIG. 8 is a high-level flowchart illustrating methods and techniques to identify the presence of compiled segments of code in a store for compiled segments of code, according to some embodiments.

FIG. 8 is a high-level flowchart illustrating methods and techniques to identify the presence of compiled segments of code in a store for compiled segments of code, according to some embodiments. As indicated at 810, a segment of code to execute a plan to perform a query may be identified, in some embodiments. For example, a query plan may be grouped into one (or multiple) operations (e.g., logical query plan operations may be isolated into physical query plan operation(s) that correspond to the logical query plan operations). The code may correspond to the respective one or more operations which may, for instance, access data, evaluate data, transform data, and/or store/move the data, in various examples.

As indicated at 820, a unique identifier may be generated for the segment of code, in some embodiments. In one example embodiment, a random number may be generated to serve as the unique identifier. In another example embodiment, various hash functions or hashing schemes may be applied to a text character string of the code (or to certain portions of the code) in order to generate a hash value. Unique identifiers may incorporate different information. For instance, the generated hash value may be concatenated or otherwise added to a version identifier for the application implementing the query engine.

As indicated at 830, the unique identifier may be used as a lookup key in a store for a compiled version of the segment of code, in some embodiments. For example, the store for compiled versions of code may be a key-value store (e.g., a non-relational database, object-based store, or relational database, or other data store that utilizes a key or other identifier to lookup an associated value), in some embodiments. A request may be formatted and sent to the store (e.g., an API request, SQL request, REST style request) that includes the hash value as the lookup key value that is applied to locate data that corresponds to the lookup key value.

As indicated at 840, a compiled segment may or may not be returned using the lookup key, in some embodiments. If, for instance, no compiled segment is returned then a compiled version of the segment of code may be determined as not exist (as a compiled segment of code would be stored at an entry in the store if such a segment of code were to exist). Then, as indicated at 842, the segment of code may be compiled to use for executing the plan, in some embodiments. If the compiled segment is returned, then the returned compiled segment to execute the plan for performing the query, in some embodiments, as indicated at 850. For example, the response from the data store may include a data object as the field, attribute, or other value of the entry corresponding to the lookup key. The data object may be compressed and/or encrypted, and thus may be decompressed and/or decrypted, in some embodiments. Use of the returned compiled segment may insert or otherwise apply parameters for the portion of the query that corresponds to the segment of code in order to execute the complied segment when performing the query.

Figure 9:
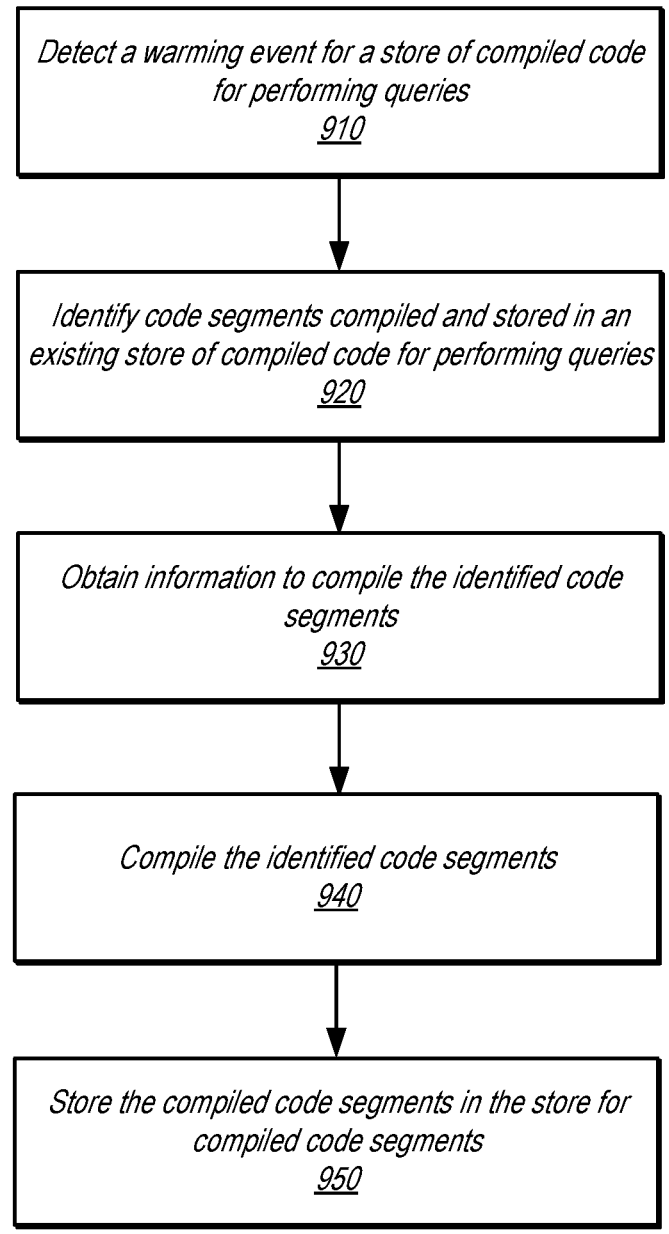
FIG. 9 is a high-level flowchart illustrating methods and techniques to warm a store for compiled code for executing queries, according to some embodiments.

FIG. 9 is a high-level flowchart illustrating methods and techniques to warm a store for compiled code for executing queries, according to some embodiments. As indicated at 910, a warming event for a store of compiled code for performing queries may be detected, in some embodiments. A warming event may be an event for a new store of compiled code (e.g., a new cache of compiled code created in a new storage structure, such as a new table illustrated in FIG. 6 above), in some embodiments. In such embodiments, the new store may be created as a result of a change in compiler, query engine, or other feature of performing queries that may use an updated compilation in order to use the compiled code segments to execute queries. For example, a query engine update to install a new version of the query engine may trigger a warming event.

As indicated at 920, code segments compiled and stored in an existing store of compiled code for performing queries may be identified, in some embodiments. For example, an index, manifest, list, or other metadata maintained for the contents of an existing store of compiled code may be scanned to identify distinct items. As indicated at 930, information to compile the identified code segments may be obtained, in some embodiments. For example, compiled code objects in the existing store may include a source identifier for the code used to generate the code objects in another data store (e.g., another data storage service), which may be used to locate corresponding code segments in a data store. In some embodiments, the code segments may be recreated from a stored query plan or query that would include the code segments in order to be compiled.

As indicated at 940, the identified code segments may be compiled, in some embodiments. For example, the data store that stores the code segments may be read at the identified locations, and then each identified code segment may be compiled. The compilation may account for the changes that triggered the warming event, in some embodiments. For example, an update to a query engine may include an update to the compiler to account for the change in the query engine. In some embodiments, the compilation may utilize a different set of compiler features or settings, such as an optimized compilation setting that may increase compilation time but achieve a more performant executable object for the compiled code segments.

As indicated at 950, the compiled code segments may be stored in the store for compiled code segments, in some embodiments. For example, a new table or other data structure that stores the compiled code segments may be created and then updated with the compiled code segments as different items or objects in the new table.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of sharing compiled code to execute queries across query engines as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
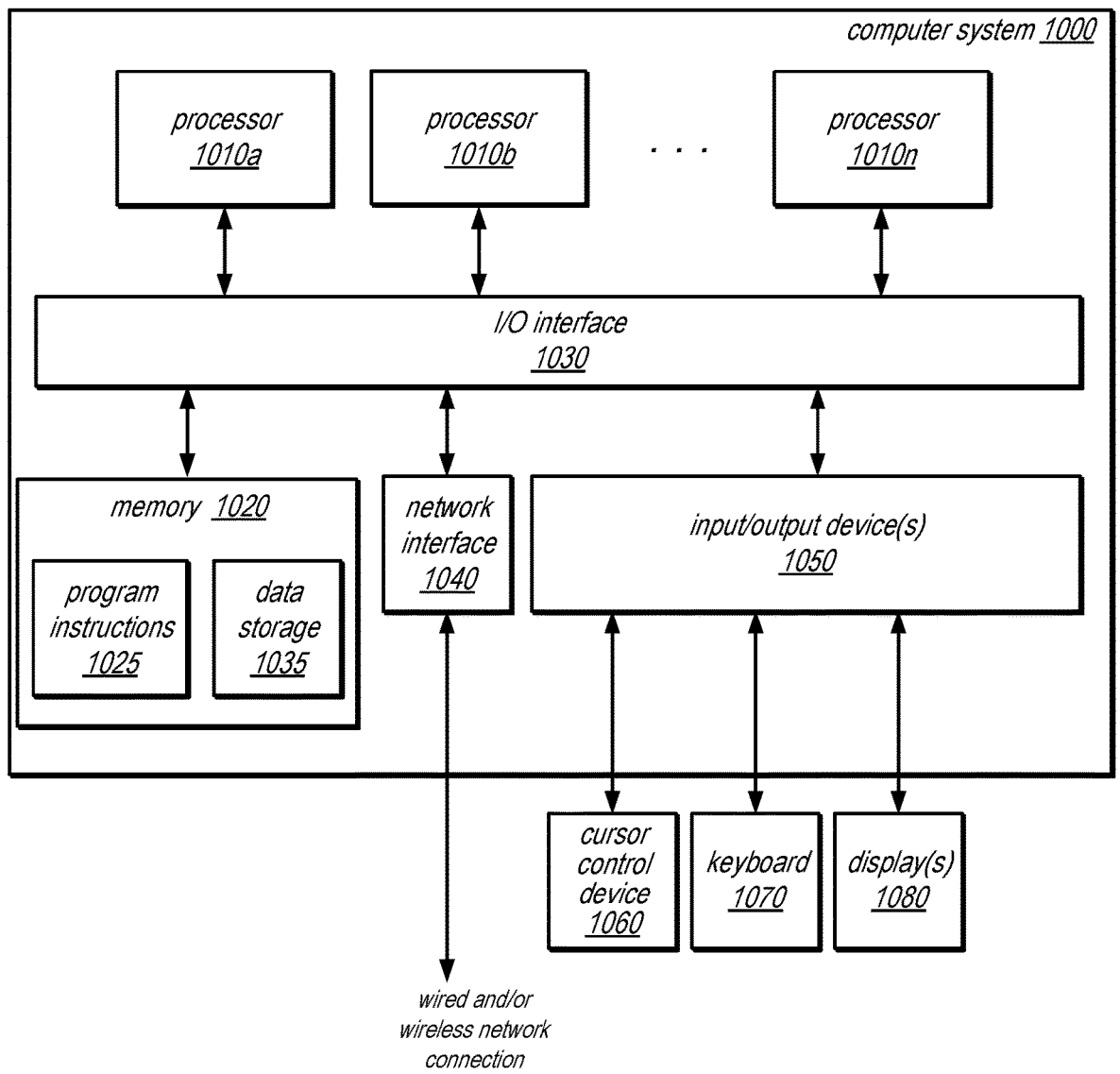
FIG. 10 illustrates an example system that implements the various methods, techniques, and systems described herein, according to some embodiments.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program that when executed by the at least one processor cause the at least one processor to implement a query engine;
   the query engine, configured to:
      receive a query to a database;
      generate a plurality of portions of code for a query execution plan to perform the query;
      before compiling the plurality of portions of code:
         determine that a portion of code of the plurality of portions of code for the query execution plan is not compiled and that the portion of code is not stored in a local store of one or more portions of compiled code at the query engine,
         obtain a compiled version of the portion of code of the plurality of portions of code from a global store, wherein the compiled version of the portion of code of the plurality of portions of code stored in the global store was previously generated for a prior query execution plan to perform a prior query received at a second query engine, and
         store the compiled version of the portion of code obtained from the global store in the local store; and
      use the compiled version of the portion of code of the plurality of portions of code obtained from the global store and stored in the local store instead of compiling the portion of code when executing the query execution plan to perform the query.

2. The system of claim 1, wherein the query engine is further configured to:
   receive a second query to the database;
   generate another plurality of portions of code to execute another plan to perform the second query;
   before compiling the other plurality of portions of code:
      determine that another portion of code of the other plurality of portions of code to execute the plan is not compiled and that the other portion of code is not stored in the local store, and
      evaluate the global store of one or more compiled portions of code at the query engine to determine that the other portion of code of the other plurality of portions of code to execute the plan is not compiled and stored in the global store;
   compile the other portion of code of the other plurality of portions of code; and
   use the compiled version of the other portion of code when executing the other plan to perform the second query.

3. The system of claim 1, wherein the query engine is implemented as part of processing cluster for a data warehouse service of a provider network, wherein the database is stored as part of the data warehouse service, and wherein the different query is directed to a different database hosted in the data warehouse service.

4. The system of claim 1, wherein the query is different than the prior query received at the second query engine.

5. A method, comprising:
   generating, by a first query engine, a plurality of portions of code for a query execution plan to perform a query received at the first query engine;

determining, by the first query engine, that a portion of code of the plurality of portions of code to execute the plan is not compiled and that the portion of code is not stored in a first data store of one or more portions of compiled code at the first query engine;

obtaining, by the first query engine, a compiled version of the portion of code of the plurality of portions of code from a second data store, wherein the compiled version of the portion of code of the plurality of portions of code stored in the second data store was previously generated for a prior query execution plan to perform a prior query received at a second query engine, storing, by the first query engine, the compiled version of the portion of code obtained from the second data store in the first data store; and executing, by the first query engine, the compiled version of the portion of code of the plurality of portions of code obtained from the second data store and stored in the first data store when executing the query execution plan to perform the query.

6. The method of claim 5, wherein evaluating the first data store of the one or more portions of compiled code at the first query engine comprises:

generating a unique identifier for the portion the code of the plurality of portions of code;

using the unique identifier as a lookup key at the first data store to determine that the portion of code to execute the plan is not compiled and stored in the first data store; and wherein obtaining the compiled version of the portion of code of the plurality of portions of code from the second data store comprises using the unique identifier as a lookup key at the second data store to obtain the compiled version of the portion of code of the plurality of portions of code.

7. The method of claim 5, further comprising:

generating, by the first query engine, another portions of code to execute another plan to perform a second query received at the first query engine;

determining, by the first query engine, that the other portion of code of the other plurality of portions of code to execute the plan is not compiled and that the other portion of code is not stored in the first data store;

determining, by the first query engine, that the other portion of code of the other plurality of portions of code to execute the plan is not compiled and stored in the second data store;

compiling, by the first query engine, the other portion of code of the other plurality of portions of code; and executing, by the first query engine, the compiled version of the one other portion of code when executing the other plan to perform the second query.

8. The method of claim 7, further comprising storing, by the first query engine, the compiled version of the other portion of code of the other plurality of portions of code to the second data store.

9. The method of claim 7, further comprising storing the compiled version of the other portion of code of the other plurality of portions of code to the second data store according to a determined size of the compiled version of the other portion of code of the other plurality of portions of code.

10. The method of claim 7, further comprising:

storing, by the first query engine, the other portion of code of the other plurality of portions of code to a third data store;

accessing, by a query execution code compilation service, the third data store to obtain the other portion of code of the other plurality of portions of code;

compiling, by the query execution code compilation service, the other portion of code of the other plurality of portions of code; and storing, by the query execution code compilation service, to the second data store.

11. The method of claim 10, wherein a compilation setting applied when compiling the other portion of code of the other plurality of portions of code by the query execution code compilation service is different than the same compilation setting applied when compiling the other portion of code of the other plurality of portions of code by the first query engine.

12. The method of claim 5, further comprising:

before receiving the query:

detecting a warming event for the second data store;

identifying the other portion of code of the other plurality of portions of code as a code segment compiled and stored in a third data store;

compiling the identified other portion of code of the other plurality of portions of code; and storing the compiled version of the identified other portion of code of the other plurality of portions of code in the second data store.

13. The method of claim 12, wherein the warming event is triggered by a deployment of a different version of an application implementing the first query engine at a host for the first query engine.

14. One or more non-transitory, computer-readable storage media, storing program instructions that when executed on or across one or more computing devices cause the one or more computing devices to implement:

generating, by a first query engine, a plurality of portions of code for a query execution plan to perform a query received at the first query engine;

before compiling the plurality of portions of code at the first query engine:

determining, by the first query engine, that a first data store of one or more portions of compiled code at the first query engine does not include the portion of code of the plurality of portions of code to execute the plan, obtaining, by the first query engine, a compiled version of the portion of code of the plurality of portions of code from a second data store, wherein the compiled version of the portion of code of the plurality of portions of code stored in the second data store was previously generated for a prior query execution plan to perform a prior query received at a second query engine, and storing, by the first query engine, the compiled version of the portion of code obtained from the second data store in the first data store; and executing, by the first query engine, the compiled version of the portion of code of the plurality of portions of code obtained from the second data store and stored in the first data store when executing the query execution plan to perform the query.

15. The one or more non-transitory, computer-readable storage media of claim 14, wherein the one or more non-transitory, computer-readable storage media comprise further program instructions that when executed by the one or more computing devices cause the one or more computing devices to further implement:

generating, by the first query engine, another plurality of portions of code to execute another plan to perform a second query received at the first query engine;

before compiling the other plurality of portions of code at the first query engine:

determining, by the first query engine, that the first data store at the first query engine of the one or more portions of compiled code at the first query engine includes another portion of code of the other plurality of portions of code to execute the other plan, wherein the other portion of code included in the first data store is the compiled version of the other portion of code of the other plurality of portions of code; and executing, by the first query engine, the compiled version of the other portion of code of the other plurality of portions of code obtained from the first data store when executing the other plan to perform the second query.

16. The one or more non-transitory, computer-readable storage media of claim 14, wherein the compiled version of the portion of code of the plurality of portions of code was stored in the second data store responsive to a warming event detected for the second data store.

17. The one or more non-transitory, computer-readable storage media of claim 14, wherein, in obtaining the compiled version of the portion of code of the plurality of portions of code from the second data store, the program instructions cause the one or more computing devices to implement decompressing the compiled version of the portion of code of the plurality of portions of code received from the second data store.

18. The one or more non-transitory, computer-readable storage media of claim 14, wherein, in determining that the first data store of one or more portions of compiled code at the first query engine does not include the portion of code to execute the plan, the program instructions cause the one or more computing devices to implement:

generating a unique identifier for the portion of code of the plurality of portions of the code based, at least in part, on a version identifier for the first query engine;

using the unique identifier as a lookup key at the first data store to determine that the portion of code of the plurality of portions of code to execute the plan is not compiled and stored in the first data store; and wherein, in obtaining the compiled version of the portion of code of the plurality of portions of code from the second data store, the program instructions cause the one or more computing devices to implement using the unique identifier as a lookup key at the second data store to obtain the compiled version of the portion of code of the plurality of portions of code.

19. The one or more non-transitory, computer-readable storage media of claim 14, wherein the one or more non-transitory, computer-readable storage media comprise further program instructions that when executed by the one or more computing devices cause the one or more computing devices to further implement:

before compiling the code at the first query engine:

determining, by the first query engine, that the first data store at the first query engine of one or more portions of compiled portions of code at the first query engine does not include at least one additional portion of code of the plurality of portions of code to execute the plan, and obtaining, by the first query engine, a compiled version of the at least one additional portion of code of the plurality of portions of code from a second data store, wherein the compiled version of the at least one additional portion of code of the plurality of portions of code stored in the global store was previously generated from a plan to perform a prior query received at the second query engine; and executing, by the first query engine, the compiled version of the at least one additional portion of code of the plurality of portions of code when executing the plan to perform the query.

20. The one or more non-transitory, computer-readable storage media of claim 14, wherein the query is different than the prior query received at the second query engine.

* * * * *